United States Patent
Parkvall et al.

(10) Patent No.: US 7,689,178 B2
(45) Date of Patent: Mar. 30, 2010

(54) METHOD AND APPARATUS FOR SPREADING SEQUENCE HOPPING IN CODE-MULTIPLEXED CONTROL CHANNELS

(75) Inventors: Stefan Parkvall, Stockholm (SE); Jung Fu Cheng, Cary, NC (US); Yi-Pin Eric Wang, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1031 days.

(21) Appl. No.: 11/015,599

(22) Filed: Dec. 17, 2004

(65) Prior Publication Data

US 2006/0056360 A1 Mar. 16, 2006

(30) Foreign Application Priority Data

Sep. 13, 2004 (SE) .................................... 0402210

(51) Int. Cl.
*H04B 1/04* (2006.01)
*H04B 7/216* (2006.01)
(52) U.S. Cl. .................................... 455/114.2; 370/335
(58) Field of Classification Search ........................ None
See application file for complete search history.

(56) References Cited

U.S. PATENT DOCUMENTS

| | | | | |
|---|---|---|---|---|
| 5,297,162 | A * | 3/1994 | Lee et al. | 375/143 |
| 6,356,555 | B1 * | 3/2002 | Rakib et al. | 370/441 |
| 2003/0039230 | A1 * | 2/2003 | Ostman et al. | 370/335 |

FOREIGN PATENT DOCUMENTS

| | | |
|---|---|---|
| EP | 0902549 A2 | 3/1999 |
| WO | WO 99/49594 | 9/1999 |

OTHER PUBLICATIONS

Stefan Parkvall, Eva Englund, Ke Wang Helmersson, Maria Samuelsson, "WCDMA Uplink Enhancements for High-Speed Data Access," Proceedings of the 2004 IEEE 60th Vehicular Technology Conference, Los Angeles, CA, Sep. 26-29, 2004, 5 pages.
Qualcomm, "Impact of DL Support Channels on E-DPDCH," 3GPP TSG RAN WG1 #33, New York, Aug. 25-29, 2003, 10 pages.
"3rd Generation Partnership Project; Technical Specification Group Radio Access Network; Physical channels and mapping of transport channels onto physical channels (FDD) (Release 6)," 3GPP TS 25.211, V6.2.0 (Sep. 2004), 56 pages.

* cited by examiner

*Primary Examiner*—Nick Corsaro
*Assistant Examiner*—Joel Ajayi
(74) *Attorney, Agent, or Firm*—Coates & Bennett, PLLC

(57) ABSTRACT

A method and apparatus for code multiplexing one or more control signals onto a shared control channel. According to the present invention, a control signal for transmission from a base station to a mobile station terminal is repeated in each slot of a predetermined time interval. The control signal in each slot is spread using a bit-level spreading sequence, where the bit-level spreading sequence varies from slot to slot according to a predefined sequence-hopping pattern. The spread control signals generated for transmission to each mobile station terminal are then combined and spread using a common channelization code.

22 Claims, 11 Drawing Sheets

LENGTH-20 HADAMARD SEQUENCES $c_0 = (1\ 1\ 1\ 1\ 1\ 1\ 1\ 1\ 1\ 1\ 1\ 1\ 1\ 1\ 1\ 1\ 1\ 1\ 1\ 1)^T$
$c_1 = (1\ -1\ -1\ 1\ 1\ -1\ -1\ -1\ -1\ 1\ -1\ 1\ -1\ 1\ 1\ 1\ 1\ -1\ -1\ 1)^T$
$c_2 = (1\ -1\ 1\ 1\ -1\ -1\ -1\ -1\ 1\ -1\ 1\ -1\ 1\ 1\ 1\ 1\ -1\ -1\ 1\ -1)^T$
$c_3 = (1\ 1\ 1\ -1\ -1\ -1\ -1\ 1\ -1\ 1\ -1\ 1\ 1\ 1\ 1\ -1\ -1\ 1\ -1\ -1)^T$
$c_4 = (1\ 1\ -1\ -1\ -1\ -1\ 1\ -1\ 1\ -1\ 1\ 1\ 1\ 1\ -1\ -1\ 1\ -1\ -1\ 1)^T$
$c_5 = (1\ -1\ -1\ -1\ -1\ 1\ -1\ 1\ -1\ 1\ 1\ 1\ 1\ -1\ -1\ 1\ -1\ -1\ 1\ 1)^T$
$c_6 = (1\ -1\ -1\ -1\ 1\ -1\ 1\ -1\ 1\ 1\ 1\ 1\ -1\ -1\ 1\ -1\ -1\ 1\ 1\ -1)^T$
$c_7 = (1\ -1\ -1\ 1\ -1\ 1\ -1\ 1\ 1\ 1\ 1\ -1\ -1\ 1\ -1\ -1\ 1\ 1\ -1\ -1)^T$
$c_8 = (1\ -1\ 1\ -1\ 1\ -1\ 1\ 1\ 1\ 1\ -1\ -1\ 1\ -1\ -1\ 1\ 1\ -1\ -1\ -1)^T$
$c_9 = (1\ 1\ -1\ 1\ -1\ 1\ 1\ 1\ 1\ -1\ -1\ 1\ -1\ -1\ 1\ 1\ -1\ -1\ -1\ -1)^T$
$c_{10} = (1\ -1\ 1\ -1\ 1\ 1\ 1\ 1\ -1\ -1\ 1\ -1\ -1\ 1\ 1\ -1\ -1\ -1\ -1\ 1)^T$
$c_{11} = (1\ 1\ -1\ 1\ 1\ 1\ 1\ -1\ -1\ 1\ -1\ -1\ 1\ 1\ -1\ -1\ -1\ -1\ 1\ -1)^T$
$c_{12} = (1\ -1\ 1\ 1\ 1\ 1\ -1\ -1\ 1\ -1\ -1\ 1\ 1\ -1\ -1\ -1\ -1\ 1\ -1\ 1)^T$
$c_{13} = (1\ 1\ 1\ 1\ 1\ -1\ -1\ 1\ -1\ -1\ 1\ 1\ -1\ -1\ -1\ -1\ 1\ -1\ 1\ -1)^T$
$c_{14} = (1\ 1\ 1\ 1\ -1\ -1\ 1\ -1\ -1\ 1\ 1\ -1\ -1\ -1\ -1\ 1\ -1\ 1\ -1\ 1)^T$
$c_{15} = (1\ 1\ 1\ -1\ -1\ 1\ -1\ -1\ 1\ 1\ -1\ -1\ -1\ -1\ 1\ -1\ 1\ -1\ 1\ 1)^T$
$c_{16} = (1\ 1\ -1\ -1\ 1\ -1\ -1\ 1\ 1\ -1\ -1\ -1\ -1\ 1\ -1\ 1\ -1\ 1\ 1\ 1)^T$
$c_{17} = (1\ -1\ -1\ 1\ -1\ -1\ 1\ 1\ -1\ -1\ -1\ -1\ 1\ -1\ 1\ -1\ 1\ 1\ 1\ 1)^T$
$c_{18} = (1\ 1\ 1\ -1\ -1\ 1\ 1\ -1\ -1\ -1\ -1\ 1\ -1\ 1\ -1\ 1\ 1\ 1\ 1\ -1)^T$
$c_{19} = (1\ 1\ -1\ -1\ 1\ 1\ -1\ -1\ -1\ -1\ 1\ 1\ -1\ 1\ 1\ 1\ 1\ 1\ -1\ -1)^T$

LENGTH-20 HADAMARD SEQUENCES $C_0 = (1\ 1\ 1\ 1\ 1\ 1\ 1\ 1\ 1\ 1\ 1\ 1\ 1\ 1\ 1\ 1\ 1\ 1\ 1\ 1)^T$
$C_1 = (1\ -1\ -1\ 1\ 1\ -1\ -1\ -1\ -1\ 1\ -1\ 1\ -1\ 1\ 1\ 1\ 1\ -1\ -1\ 1)^T$
$C_2 = (1\ -1\ 1\ 1\ -1\ -1\ -1\ -1\ 1\ -1\ 1\ -1\ 1\ 1\ 1\ 1\ -1\ -1\ 1\ -1)^T$
$C_3 = (1\ 1\ 1\ -1\ -1\ -1\ -1\ 1\ -1\ 1\ -1\ 1\ 1\ 1\ 1\ -1\ -1\ 1\ -1\ -1)^T$
$C_4 = (1\ 1\ -1\ -1\ -1\ -1\ 1\ -1\ 1\ -1\ 1\ 1\ 1\ 1\ -1\ -1\ 1\ -1\ -1\ 1)^T$
$C_5 = (1\ -1\ -1\ -1\ -1\ 1\ -1\ 1\ -1\ 1\ 1\ 1\ 1\ -1\ -1\ 1\ -1\ -1\ 1\ 1)^T$
$C_6 = (1\ -1\ -1\ -1\ 1\ -1\ 1\ -1\ 1\ 1\ 1\ 1\ -1\ -1\ 1\ -1\ -1\ 1\ 1\ -1)^T$
$C_7 = (1\ -1\ -1\ 1\ -1\ 1\ -1\ 1\ 1\ 1\ 1\ -1\ -1\ 1\ -1\ -1\ 1\ 1\ -1\ -1)^T$
$C_8 = (1\ -1\ 1\ -1\ 1\ -1\ 1\ 1\ 1\ 1\ -1\ -1\ 1\ -1\ -1\ 1\ 1\ -1\ -1\ -1)^T$
$C_9 = (1\ 1\ -1\ 1\ -1\ 1\ 1\ 1\ 1\ -1\ -1\ 1\ -1\ -1\ 1\ 1\ -1\ -1\ -1\ -1)^T$
$C_{10} = (1\ -1\ 1\ -1\ 1\ 1\ 1\ 1\ -1\ -1\ 1\ -1\ -1\ 1\ 1\ -1\ -1\ -1\ -1\ 1)^T$
$C_{11} = (1\ 1\ -1\ 1\ 1\ 1\ 1\ -1\ -1\ 1\ -1\ -1\ 1\ 1\ -1\ -1\ -1\ -1\ 1\ -1)^T$
$C_{12} = (1\ -1\ 1\ 1\ 1\ 1\ -1\ -1\ 1\ -1\ -1\ 1\ 1\ -1\ -1\ -1\ -1\ 1\ -1\ 1)^T$
$C_{13} = (1\ 1\ 1\ 1\ 1\ -1\ -1\ 1\ -1\ -1\ 1\ 1\ -1\ -1\ -1\ -1\ 1\ -1\ 1\ -1)^T$
$C_{14} = (1\ 1\ 1\ 1\ -1\ -1\ 1\ -1\ -1\ 1\ 1\ -1\ -1\ -1\ -1\ 1\ -1\ 1\ -1\ 1)^T$
$C_{15} = (1\ 1\ 1\ -1\ -1\ 1\ -1\ -1\ 1\ 1\ -1\ -1\ -1\ -1\ 1\ -1\ 1\ -1\ 1\ 1)^T$
$C_{16} = (1\ 1\ -1\ -1\ 1\ -1\ -1\ 1\ 1\ -1\ -1\ -1\ -1\ 1\ -1\ 1\ -1\ 1\ 1\ 1)^T$
$C_{17} = (1\ -1\ -1\ 1\ -1\ -1\ 1\ 1\ -1\ -1\ -1\ -1\ 1\ -1\ 1\ -1\ 1\ 1\ 1\ 1)^T$
$C_{18} = (1\ 1\ 1\ -1\ -1\ 1\ 1\ -1\ -1\ -1\ -1\ 1\ -1\ 1\ -1\ 1\ 1\ 1\ 1\ -1)^T$
$C_{19} = (1\ 1\ -1\ -1\ 1\ 1\ -1\ -1\ -1\ -1\ 1\ -1\ 1\ -1\ 1\ 1\ 1\ 1\ -1\ -1)^T$

FIG. 1

| CH | SLOT | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 1 | 0 | 1 | 2 | 3 | 4 | 5 | 6 | 7 | 8 | 9 | 10 | 11 | 12 | 13 | 14 |
| 2 | 1 | 2 | 3 | 4 | 5 | 6 | 7 | 8 | 9 | 10 | 11 | 12 | 13 | 14 | 15 |
| 3 | 2 | 3 | 4 | 5 | 6 | 7 | 8 | 9 | 10 | 11 | 12 | 13 | 14 | 15 | 16 |
| 4 | 3 | 4 | 5 | 6 | 7 | 8 | 9 | 10 | 11 | 12 | 13 | 14 | 15 | 16 | 17 |
| 5 | 4 | 5 | 6 | 7 | 8 | 9 | 10 | 11 | 12 | 13 | 14 | 15 | 16 | 17 | 18 |
| 6 | 5 | 6 | 7 | 8 | 9 | 10 | 11 | 12 | 13 | 14 | 15 | 16 | 17 | 18 | 19 |
| 7 | 6 | 7 | 8 | 9 | 10 | 11 | 12 | 13 | 14 | 15 | 16 | 17 | 18 | 19 | 20 |
| 8 | 7 | 8 | 9 | 10 | 11 | 12 | 13 | 14 | 15 | 16 | 17 | 18 | 19 | 20 | 21 |
| 9 | 8 | 9 | 10 | 11 | 12 | 13 | 14 | 15 | 16 | 17 | 18 | 19 | 20 | 21 | 22 |
| 10 | 9 | 10 | 11 | 12 | 13 | 14 | 15 | 16 | 17 | 18 | 19 | 20 | 21 | 22 | 23 |
| 11 | 10 | 11 | 12 | 13 | 14 | 15 | 16 | 17 | 18 | 19 | 20 | 21 | 22 | 23 | 24 |
| 12 | 11 | 12 | 13 | 14 | 15 | 16 | 17 | 18 | 19 | 20 | 21 | 22 | 23 | 24 | 25 |
| 13 | 12 | 13 | 14 | 15 | 16 | 17 | 18 | 19 | 20 | 21 | 22 | 23 | 24 | 25 | 26 |
| 14 | 13 | 14 | 15 | 16 | 17 | 18 | 19 | 20 | 21 | 22 | 23 | 24 | 25 | 26 | 27 |
| 15 | 14 | 15 | 16 | 17 | 18 | 19 | 20 | 21 | 22 | 23 | 24 | 25 | 26 | 27 | 28 |
| 16 | 15 | 16 | 17 | 18 | 19 | 20 | 21 | 22 | 23 | 24 | 25 | 26 | 27 | 28 | 29 |
| 17 | 16 | 17 | 18 | 19 | 20 | 21 | 22 | 23 | 24 | 25 | 26 | 27 | 28 | 29 | 30 |
| 18 | 17 | 18 | 19 | 20 | 21 | 22 | 23 | 24 | 25 | 26 | 27 | 28 | 29 | 30 | 31 |
| 19 | 18 | 19 | 20 | 21 | 22 | 23 | 24 | 25 | 26 | 27 | 28 | 29 | 30 | 31 | 32 |
| 20 | 19 | 20 | 21 | 22 | 23 | 24 | 25 | 26 | 27 | 28 | 29 | 30 | 31 | 32 | 33 |
| 21 | 20 | 21 | 22 | 23 | 24 | 25 | 26 | 27 | 28 | 29 | 30 | 31 | 32 | 33 | 34 |
| 22 | 21 | 22 | 23 | 24 | 25 | 26 | 27 | 28 | 29 | 30 | 31 | 32 | 33 | 34 | 35 |
| 23 | 22 | 23 | 24 | 25 | 26 | 27 | 28 | 29 | 30 | 31 | 32 | 33 | 34 | 35 | 36 |
| 24 | 23 | 24 | 25 | 26 | 27 | 28 | 29 | 30 | 31 | 32 | 33 | 34 | 35 | 36 | 37 |
| 25 | 24 | 25 | 26 | 27 | 28 | 29 | 30 | 31 | 32 | 33 | 34 | 35 | 36 | 37 | 38 |
| 26 | 25 | 26 | 27 | 28 | 29 | 30 | 31 | 32 | 33 | 34 | 35 | 36 | 37 | 38 | 39 |
| 27 | 26 | 27 | 28 | 29 | 30 | 31 | 32 | 33 | 34 | 35 | 36 | 37 | 38 | 39 | 0 |
| 28 | 27 | 28 | 29 | 30 | 31 | 32 | 33 | 34 | 35 | 36 | 37 | 38 | 39 | 0 | 1 |
| 29 | 28 | 29 | 30 | 31 | 32 | 33 | 34 | 35 | 36 | 37 | 38 | 39 | 0 | 1 | 2 |
| 30 | 29 | 30 | 31 | 32 | 33 | 34 | 35 | 36 | 37 | 38 | 39 | 0 | 1 | 2 | 3 |
| 31 | 30 | 31 | 32 | 33 | 34 | 35 | 36 | 37 | 38 | 39 | 0 | 1 | 2 | 3 | 4 |
| 32 | 31 | 32 | 33 | 34 | 35 | 36 | 37 | 38 | 39 | 0 | 1 | 2 | 3 | 4 | 5 |
| 33 | 32 | 33 | 34 | 35 | 36 | 37 | 38 | 39 | 0 | 1 | 2 | 3 | 4 | 5 | 6 |
| 34 | 33 | 34 | 35 | 36 | 37 | 38 | 39 | 0 | 1 | 2 | 3 | 4 | 5 | 6 | 7 |
| 35 | 34 | 35 | 36 | 37 | 38 | 39 | 0 | 1 | 2 | 3 | 4 | 5 | 6 | 7 | 8 |
| 36 | 35 | 36 | 37 | 38 | 39 | 0 | 1 | 2 | 3 | 4 | 5 | 6 | 7 | 8 | 9 |
| 37 | 36 | 37 | 38 | 39 | 0 | 1 | 2 | 3 | 4 | 5 | 6 | 7 | 8 | 9 | 10 |
| 38 | 37 | 38 | 39 | 0 | 1 | 2 | 3 | 4 | 5 | 6 | 7 | 8 | 9 | 10 | 11 |
| 39 | 38 | 39 | 0 | 1 | 2 | 3 | 4 | 5 | 6 | 7 | 8 | 9 | 10 | 11 | 12 |
| 40 | 39 | 0 | 1 | 2 | 3 | 4 | 5 | 6 | 7 | 8 | 9 | 10 | 11 | 12 | 13 |

*FIG. 6*

| CH | SLOT | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| 1 | 12 | 23 | 37 | 6 | 17 | 11 | 38 | 30 | 4 | 21 | 22 | 34 | 31 | 9 | 3 |
| 2 | 8 | 17 | 3 | 36 | 19 | 29 | 34 | 32 | 14 | 12 | 2 | 13 | 7 | 20 | 16 |
| 3 | 9 | 26 | 28 | 14 | 25 | 15 | 39 | 20 | 22 | 31 | 32 | 12 | 8 | 35 | 1 |
| 4 | 1 | 21 | 6 | 8 | 18 | 0 | 24 | 38 | 23 | 15 | 39 | 9 | 2 | 29 | 28 |
| 5 | 37 | 20 | 11 | 38 | 36 | 1 | 30 | 2 | 12 | 39 | 25 | 7 | 26 | 4 | 29 |
| 6 | 2 | 31 | 8 | 10 | 21 | 39 | 22 | 14 | 26 | 5 | 27 | 38 | 35 | 28 | 20 |
| 7 | 38 | 7 | 27 | 9 | 32 | 22 | 33 | 28 | 39 | 6 | 13 | 17 | 16 | 18 | 21 |
| 8 | 30 | 9 | 26 | 21 | 5 | 13 | 15 | 16 | 1 | 35 | 38 | 18 | 28 | 0 | 12 |
| 9 | 24 | 10 | 0 | 39 | 4 | 12 | 20 | 22 | 34 | 32 | 11 | 23 | 14 | 37 | 2 |
| 10 | 14 | 0 | 35 | 32 | 3 | 26 | 31 | 39 | 36 | 22 | 23 | 21 | 4 | 8 | 25 |
| 11 | 29 | 36 | 9 | 20 | 22 | 37 | 1 | 12 | 0 | 18 | 26 | 35 | 15 | 6 | 13 |
| 12 | 32 | 12 | 16 | 25 | 26 | 9 | 4 | 24 | 11 | 0 | 34 | 1 | 13 | 22 | 5 |
| 13 | 10 | 5 | 15 | 34 | 27 | 17 | 32 | 11 | 19 | 23 | 7 | 16 | 0 | 31 | 18 |
| 14 | 35 | 14 | 36 | 13 | 15 | 2 | 29 | 10 | 16 | 33 | 37 | 24 | 9 | 11 | 8 |
| 15 | 17 | 38 | 4 | 11 | 28 | 33 | 6 | 0 | 13 | 14 | 24 | 8 | 34 | 3 | 26 |
| 16 | 5 | 16 | 14 | 19 | 10 | 32 | 0 | 34 | 21 | 17 | 28 | 6 | 36 | 7 | 33 |
| 17 | 31 | 18 | 33 | 26 | 0 | 16 | 36 | 8 | 10 | 20 | 9 | 25 | 22 | 24 | 30 |
| 18 | 39 | 3 | 20 | 7 | 2 | 25 | 14 | 17 | 29 | 1 | 8 | 28 | 37 | 15 | 6 |
| 19 | 34 | 35 | 12 | 29 | 28 | 6 | 13 | 23 | 18 | 11 | 30 | 27 | 3 | 2 | 19 |
| 20 | 20 | 27 | 25 | 22 | 16 | 38 | 26 | 18 | 5 | 13 | 0 | 29 | 1 | 39 | 23 |
| 21 | 4 | 25 | 30 | 12 | 38 | 27 | 16 | 29 | 17 | 19 | 15 | 36 | 23 | 34 | 11 |
| 22 | 19 | 28 | 21 | 2 | 6 | 7 | 10 | 37 | 33 | 27 | 12 | 4 | 30 | 26 | 31 |
| 23 | 6 | 32 | 39 | 1 | 30 | 3 | 17 | 35 | 20 | 25 | 5 | 0 | 10 | 16 | 27 |
| 24 | 21 | 1 | 38 | 5 | 7 | 23 | 25 | 15 | 8 | 29 | 14 | 37 | 12 | 30 | 36 |
| 25 | 28 | 33 | 18 | 35 | 12 | 20 | 37 | 31 | 6 | 2 | 3 | 19 | 24 | 17 | 9 |
| 26 | 18 | 6 | 34 | 30 | 33 | 31 | 2 | 7 | 37 | 9 | 1 | 14 | 27 | 10 | 17 |
| 27 | 3 | 22 | 23 | 33 | 13 | 35 | 21 | 1 | 30 | 38 | 19 | 32 | 18 | 14 | 4 |
| 28 | 33 | 24 | 2 | 18 | 34 | 4 | 28 | 9 | 15 | 8 | 6 | 31 | 21 | 36 | 32 |
| 29 | 0 | 15 | 24 | 16 | 20 | 36 | 5 | 27 | 7 | 3 | 33 | 11 | 32 | 23 | 22 |
| 30 | 7 | 2 | 13 | 28 | 23 | 30 | 27 | 6 | 9 | 24 | 31 | 20 | 33 | 19 | 14 |
| 31 | 27 | 34 | 31 | 15 | 11 | 24 | 12 | 33 | 35 | 10 | 20 | 2 | 25 | 5 | 7 |
| 32 | 16 | 8 | 32 | 3 | 14 | 5 | 19 | 21 | 27 | 34 | 36 | 22 | 29 | 33 | 24 |
| 33 | 22 | 29 | 7 | 31 | 35 | 28 | 18 | 19 | 3 | 26 | 4 | 10 | 11 | 32 | 38 |
| 34 | 26 | 30 | 29 | 23 | 31 | 10 | 8 | 5 | 2 | 37 | 17 | 3 | 38 | 13 | 35 |
| 35 | 36 | 19 | 17 | 37 | 1 | 18 | 11 | 13 | 25 | 7 | 29 | 5 | 39 | 27 | 15 |
| 36 | 13 | 37 | 10 | 24 | 9 | 8 | 23 | 26 | 31 | 4 | 18 | 39 | 19 | 1 | 0 |
| 37 | 23 | 13 | 19 | 4 | 24 | 34 | 9 | 25 | 38 | 36 | 16 | 33 | 6 | 21 | 39 |
| 38 | 25 | 11 | 22 | 27 | 37 | 21 | 3 | 4 | 28 | 30 | 35 | 26 | 17 | 12 | 10 |
| 39 | 15 | 4 | 1 | 17 | 39 | 29 | 35 | 3 | 32 | 28 | 10 | 30 | 5 | 25 | 34 |
| 40 | 11 | 39 | 5 | 0 | 8 | 14 | 7 | 36 | 24 | 16 | 21 | 15 | 20 | 38 | 37 |

*FIG. 8*

| | $c_0$ | $c_1$ | $c_2$ | $c_3$ | $c_4$ | $c_5$ | $c_6$ | $c_7$ | $c_8$ | $c_9$ | $c_{10}$ | $c_{11}$ | $c_{12}$ | $c_{13}$ | $c_{14}$ | $c_{15}$ | $c_{16}$ | $c_{17}$ | $c_{18}$ | $c_{19}$ |
|---|---|---|---|---|---|---|---|---|---|---|---|---|---|---|---|---|---|---|---|---|
| $c_0$ | 0 | 14 | 25 | 15 | 22 | 13 | 20 | 15 | 12 | 10 | 12 | 10 | 12 | 10 | 12 | 16 | 15 | 11 | 14 | 22 |
| $c_1$ | 14 | 0 | 12 | 18 | 12 | 15 | 9 | 12 | 19 | 15 | 13 | 10 | 12 | 13 | 23 | 12 | 14 | 11 | 19 | 17 |
| $c_2$ | 25 | 12 | 0 | 17 | 14 | 17 | 18 | 11 | 16 | 14 | 22 | 10 | 9 | 15 | 10 | 15 | 16 | 11 | 15 | 14 |
| $c_3$ | 15 | 18 | 17 | 0 | 13 | 11 | 12 | 13 | 14 | 16 | 20 | 15 | 13 | 11 | 12 | 9 | 11 | 18 | 15 | 16 |
| $c_4$ | 22 | 12 | 14 | 13 | 0 | 18 | 9 | 16 | 18 | 11 | 12 | 15 | 11 | 18 | 13 | 15 | 11 | 15 | 13 | 11 |
| $c_5$ | 13 | 15 | 17 | 11 | 18 | 0 | 13 | 8 | 18 | 17 | 14 | 16 | 19 | 14 | 13 | 18 | 15 | 13 | 12 | 11 |
| $c_6$ | 20 | 9 | 18 | 12 | 9 | 13 | 0 | 19 | 9 | 16 | 12 | 18 | 20 | 13 | 19 | 17 | 14 | 16 | 17 | 16 |
| $c_7$ | 15 | 12 | 11 | 13 | 16 | 8 | 19 | 0 | 15 | 11 | 19 | 18 | 15 | 15 | 19 | 14 | 17 | 11 | 15 | 14 |
| $c_8$ | 12 | 19 | 16 | 14 | 18 | 18 | 9 | 15 | 0 | 11 | 10 | 15 | 13 | 18 | 21 | 16 | 11 | 12 | 14 | 12 |
| $c_9$ | 10 | 15 | 14 | 16 | 11 | 17 | 16 | 11 | 11 | 0 | 14 | 11 | 20 | 19 | 15 | 14 | 12 | 9 | 17 | 17 |
| $c_{10}$ | 12 | 13 | 22 | 20 | 12 | 14 | 12 | 19 | 10 | 14 | 0 | 23 | 14 | 13 | 15 | 17 | 24 | 17 | 8 | 13 |
| $c_{11}$ | 10 | 10 | 10 | 15 | 15 | 16 | 18 | 18 | 15 | 11 | 23 | 0 | 14 | 15 | 11 | 21 | 16 | 14 | 17 | 10 |
| $c_{12}$ | 12 | 12 | 9 | 13 | 11 | 19 | 20 | 15 | 13 | 20 | 14 | 14 | 0 | 11 | 12 | 14 | 15 | 17 | 11 | 18 |
| $c_{13}$ | 10 | 13 | 15 | 11 | 18 | 14 | 13 | 15 | 18 | 19 | 13 | 15 | 11 | 0 | 10 | 15 | 11 | 24 | 12 | 14 |
| $c_{14}$ | 12 | 23 | 10 | 12 | 13 | 13 | 19 | 19 | 21 | 15 | 15 | 11 | 12 | 10 | 0 | 11 | 12 | 14 | 14 | 16 |
| $c_{15}$ | 16 | 12 | 15 | 9 | 15 | 18 | 17 | 14 | 16 | 14 | 17 | 21 | 14 | 15 | 11 | 0 | 15 | 10 | 11 | 11 |
| $c_{16}$ | 15 | 14 | 16 | 11 | 11 | 15 | 14 | 17 | 11 | 12 | 24 | 16 | 15 | 11 | 12 | 15 | 0 | 18 | 12 | 9 |
| $c_{17}$ | 11 | 11 | 11 | 18 | 15 | 13 | 16 | 11 | 12 | 9 | 17 | 14 | 17 | 24 | 14 | 10 | 18 | 0 | 16 | 15 |
| $c_{18}$ | 14 | 19 | 15 | 15 | 13 | 12 | 17 | 15 | 14 | 17 | 8 | 17 | 11 | 12 | 14 | 11 | 12 | 16 | 0 | 18 |
| $c_{19}$ | 22 | 17 | 14 | 16 | 11 | 11 | 16 | 14 | 12 | 17 | 13 | 10 | 18 | 14 | 16 | 11 | 9 | 15 | 18 | 0 |

*FIG. 9*

| CH | SLOT | | | | | | | | | | | | | | |
|----|----|----|----|----|----|----|----|----|----|----|----|----|----|----|----|
|    | 1  | 2  | 3  | 4  | 5  | 6  | 7  | 8  | 9  | 10 | 11 | 12 | 13 | 14 | 15 |
| 1  | 0  | 1  | 2  | 3  | 4  | 5  | 6  | 7  | 8  | 9  | 10 | 11 | 12 | 18 | 19 |
| 2  | 5  | 16 | 10 | 11 | 14 | 7  | 5  | 16 | 12 | 4  | 18 | 19 | 8  | 11 | 15 |
| 3  | 2  | 3  | 4  | 5  | 6  | 6  | 8  | 9  | 10 | 11 | 12 | 13 | 14 | 15 | 16 |
| 4  | 3  | 4  | 5  | 6  | 7  | 8  | 9  | 10 | 11 | 12 | 13 | 14 | 15 | 16 | 17 |
| 5  | 4  | 5  | 6  | 7  | 8  | 9  | 10 | 11 | 12 | 13 | 14 | 15 | 16 | 17 | 18 |
| 6  | 1  | 6  | 7  | 8  | 9  | 10 | 11 | 12 | 13 | 14 | 15 | 16 | 17 | 13 | 14 |
| 7  | 6  | 7  | 8  | 9  | 10 | 11 | 12 | 13 | 14 | 15 | 16 | 17 | 18 | 19 | 0  |
| 8  | 7  | 8  | 9  | 10 | 11 | 12 | 13 | 14 | 15 | 16 | 17 | 18 | 19 | 0  | 1  |
| 9  | 8  | 9  | 3  | 11 | 12 | 13 | 14 | 15 | 16 | 17 | 18 | 19 | 0  | 1  | 2  |
| 10 | 9  | 10 | 11 | 12 | 13 | 14 | 15 | 16 | 17 | 18 | 19 | 0  | 1  | 2  | 3  |
| 11 | 10 | 11 | 12 | 13 | 14 | 15 | 16 | 17 | 18 | 19 | 0  | 1  | 2  | 3  | 4  |
| 12 | 11 | 12 | 13 | 14 | 15 | 16 | 17 | 18 | 19 | 0  | 1  | 2  | 3  | 4  | 5  |
| 13 | 12 | 13 | 14 | 15 | 16 | 17 | 18 | 19 | 0  | 1  | 2  | 3  | 4  | 5  | 6  |
| 14 | 13 | 14 | 15 | 16 | 17 | 18 | 19 | 0  | 1  | 2  | 3  | 4  | 5  | 6  | 7  |
| 15 | 14 | 15 | 16 | 17 | 18 | 19 | 0  | 1  | 2  | 3  | 4  | 5  | 6  | 7  | 8  |
| 16 | 15 | 2  | 17 | 18 | 19 | 0  | 1  | 2  | 3  | 4  | 5  | 6  | 7  | 8  | 9  |
| 17 | 16 | 17 | 18 | 19 | 0  | 1  | 2  | 3  | 4  | 5  | 6  | 7  | 8  | 9  | 10 |
| 18 | 17 | 18 | 19 | 0  | 1  | 2  | 3  | 4  | 5  | 6  | 7  | 8  | 9  | 10 | 11 |
| 19 | 18 | 19 | 0  | 1  | 2  | 3  | 4  | 5  | 6  | 7  | 8  | 9  | 10 | 14 | 12 |
| 20 | 19 | 0  | 1  | 2  | 3  | 4  | 5  | 6  | 7  | 8  | 9  | 10 | 11 | 12 | 13 |

*FIG. 11*

METHOD AND APPARATUS FOR SPREADING SEQUENCE HOPPING IN CODE-MULTIPLEXED CONTROL CHANNELS

BACKGROUND OF THE INVENTION

The present invention relates generally to code-multiplexed control channels, and more particularly to a method and apparatus in a wireless system for code-multiplexing multiple control signals onto a shared control channel using time-varying bit-level spreading sequences with a common OVSF (orthogonal variable spreading factor) channelization code.

In wireless systems, such as Wideband Code Division Multiple Access (WCDMA) systems or CDMA2000 systems, a base station encodes and transmits data frames or packets on a downlink channel to a user equipment (UE) terminal, i.e., a mobile station. The mobile station transmits encoded data frames or packets to the base station on an uplink channel. The base station decodes the received data frames or packets to recover the encoded block of information transmitted by the mobile station.

As WCDMA and CDMA2000 evolve, enhancing uplink dedicated transport channels, e.g., those used to reduce airinterface delays, to improve system capacity, and to increase cell coverage of high bit-rate services, becomes increasingly important. The use of the Hybrid Auto-Retransmission Request (HARQ) protocol, which provides fast retransmissions and soft combining on the uplink transport channels, and the use of the Fast Rate Control (FRC) protocol, which provides data rate control, on the uplink transport channels generally helps achieve these goals. However, these two protocols require fast and reliable downlink control signalling.

In support of HARQ operations, Enhanced Dedicated Channels (E-DCHs) send control signals from the base station to the mobile station. For example, the base station uses E-DCH related HARQ Indicator Channels (E-HICHs) on the downlink channel to send an acknowledgement (ACK) or non-acknowledgement (NACK) signal to the mobile station in every transmission time interval (TTI). Because HARQ helps reduce retransmission delays and improve uplink high data-rate coverage and capacity, it is highly desirable to have reliable signalling on the E-HICH.

In support of FRC operations, the base station uses E-DCH related Relative Grant Channels (E-RGCHs) to send dedicated rate control commands to the mobile station. FRC allows the base station to fine-tune the cell-wide uplink interference (uplink noise rise) to meet target cell-wide quality of service in terms of delays, throughput, and/or call blockage. The serving base station sends a rate control signal on the downlink channel in every TTI to command the mobile station to increase or decrease the uplink transmission data rate. As well understood in the art, the rate control signal may contain any number of bits, and typically comprises either a 1-bit binary or ternary (up, down, or hold) signal.

Bit-level spreading sequences spread the rate control signals and/or the ack/nack signals across a predetermined time interval. The spread signals achieve orthogonality, and therefore achieve a desired performance, when the signal is integrated over an entire slot. As such, the channel must stay constant over the entire slot in order for orthogonality to be maintained.

The orthogonality of the spread signals holds at the receiver when the fading channel is non-dispersive and constant within a slot. However, high Doppler channels may compromise the orthogonality. Further, additional factors, such as a near-far problem, may also aggravate the problems caused by a lack of orthogonality. The near-far problem arises when the base station simultaneously transmits to a mobile station near the base station at a significantly lower transmit power than used to transmit to a mobile station far away from the base station. When orthogonality is not maintained, this near-far problem may cause significant interference at the near mobile station's receiver.

SUMMARY OF THE INVENTION

The present invention comprises a method and apparatus for code multiplexing one or more control signals onto a shared control channel. According to one embodiment of the present invention, each slot of a predetermined time interval associated with a particular mobile station is assigned a unique bit-level spreading sequence. The bit-level spreading sequence varies from slot to slot according to a predefined sequence-hopping pattern. As a result, a different bit-level spreading sequence spreads a control signal in each slot of the predetermined time interval. Further, the base station combines the spread control signals from multiple mobile stations and transmits the combined signal using a common channelization code. The bit-level spreading of the control signals enables the mobile stations to separate the control signal intended for it from the control signals intended for other mobile stations.

Applying a different bit-level spreading sequence to the control signal in each slot of a predetermined time interval (sequence "hopping") increases the likelihood of maintaining higher orthogonality of spread signals in a highly Doppler channel. As such, using different bit-level spreading sequences reduces the effects of the above-described near-far problem.

The present invention generates the set of sequence-hopping patterns according to one or more exemplary methods described further herein. In one embodiment, a cyclic process generates the set of sequence-hopping patterns. In another embodiment, a pseudo-random process generates the set of sequence-hopping patterns. In still another embodiment, an intelligent sequence assignment process generates the set of sequence-hopping patterns.

BRIEF DESCRIPTION OF THE DRAWINGS

FIG. 1 illustrates an exemplary set of Hadamard spreading sequences.

FIG. 6 illustrates an exemplary set of a sequence-hopping patterns generated using a cyclic process according to the present invention.

FIG. 8 illustrates an exemplary set of a sequence-hopping patterns generated using a pseudo-random process according to the present invention.

FIG. 9 illustrates a table of mutual near-far resistant ratios between pairs of length-20 Hadamard sequences in a flat fading channel of 200 Hz Doppler spread.

FIG. 11 illustrates a set of a sequence-hopping patterns generated using an intelligent sequence assignment process according to the present invention.

DETAILED DESCRIPTION OF THE INVENTION

For purposes of clarity but not restriction, the following description uses the term "OVSF channelization code" for the spreading sequence that spreads an input signal to the WCDMA chip rate (3.84 Mcps). Further, the following description uses the term "Hadamard sequence" or "bit-level spreading sequence" or "bit-level Hadamard sequence" interchangeably to represent the spreading sequence applied to the control signal at the bit-rate. The bit rate, for example, is equal to the chip rate divided by the spreading factor for BPSK and is equal to two times the chip rate divided by the spreading factor for QPSK. As an example, an OVSF channelization code having a spreading factor of 128 gives rise to 20 symbols in a WCDMA-slot. The resulting bit-level spreading sequence is thus based on Hadamard sequences of length 20.

According to the current state-of-the-art concept for Enhanced Uplink, a mobile station may transmit in the uplink without scheduling grant as long as the transmission data-rate is not exceedingly high. This prevents undesirable scheduling delays. Thus, many mobile stations may simultaneously transmit on the uplink using the HARQ-protocol. As a result, the base station needs to provide many E-HICH and E-RGCH signals per TTI of the downlink. In order to prevent these control signals from consuming too many OVSF (orthogonal variable spreading factor) channelization codes, a code-division multiplexed (CDM) architecture for the E-HICHs that share an OVSF-code has been proposed in "Impact of DL Support Channels on E-DPDCH" by Qualcomm, presented at 3GPP TSG RAN WG1 #33, 25-29 Aug. 2003 in New York (incorporated herein by reference). The approach taught by the Qualcomm reference sub-divides the control channel into a plurality of sub-channels, where each sub-channel corresponds to a mobile station. For each sub-channel, a unique bit-level Hadamard sequence having a duration of 1 slot spreads the corresponding 1-bit ACK/NACK signal across 1 slot of the TTI. The spread signal is then copied into each of the remaining slots of the TTI. Subsequently, a common OVSF channelization code further spreads the identically spread ACK/NACK signals in each slot of the TTI to generate the output control signal for transmission over the downlink control channel.

FIG. 1 illustrates an exemplary set $\{C_0 \ldots C_{19}\}$ of length-20 Hadamard spreading sequences. The set of Hadamard sequences shown in FIG. 1 are for illustrative purposes only and are not limiting. Other possible sets that related to this exemplary set may be achieved by permuting the columns or rows.

Figure 2:
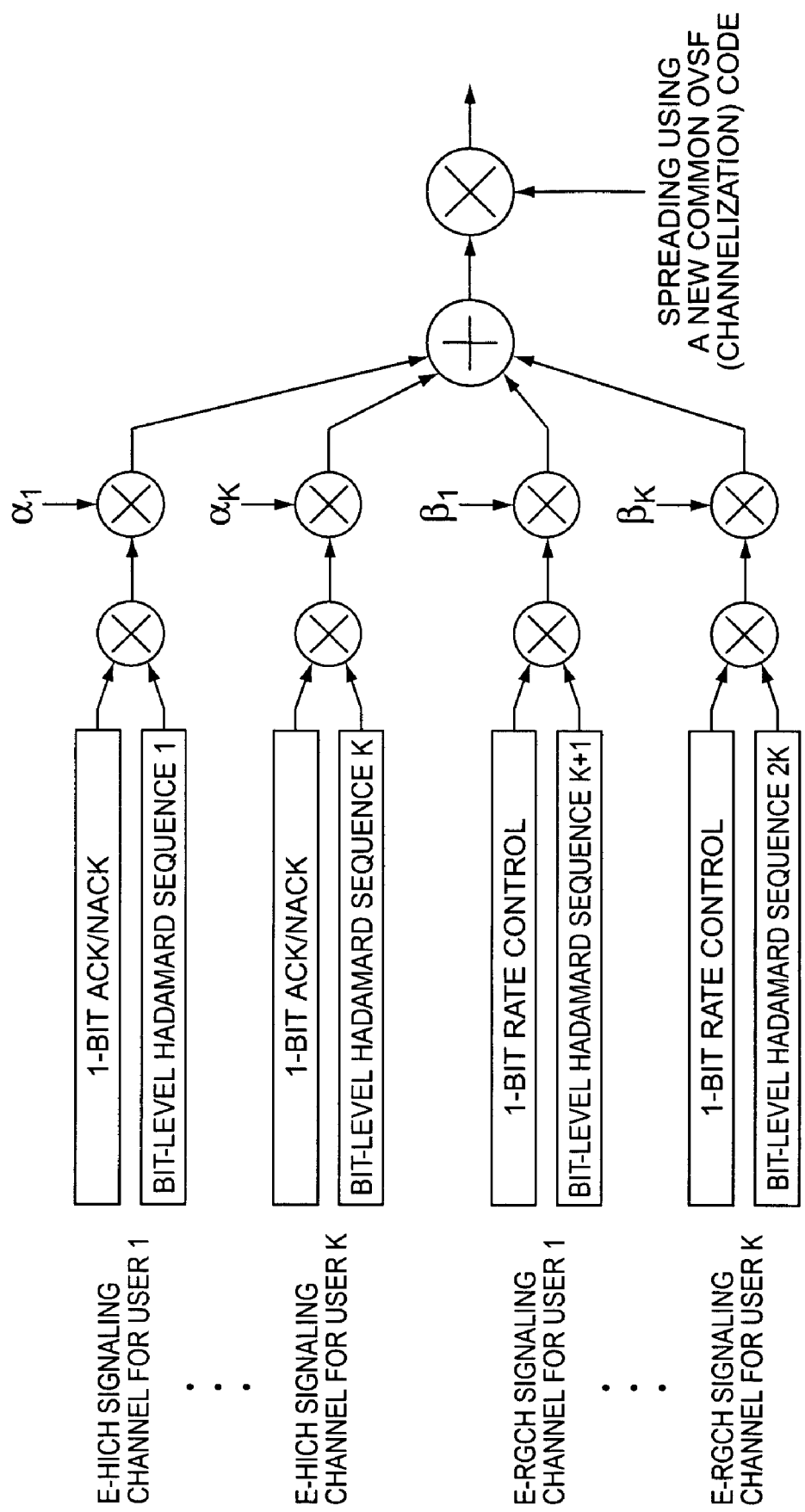
FIG. 2 illustrates a block diagram of a code-division multiplexer that code-division multiplexes E-HICH and E-RGCH control signals on a shared OVSF channelization code.
Figure 3:
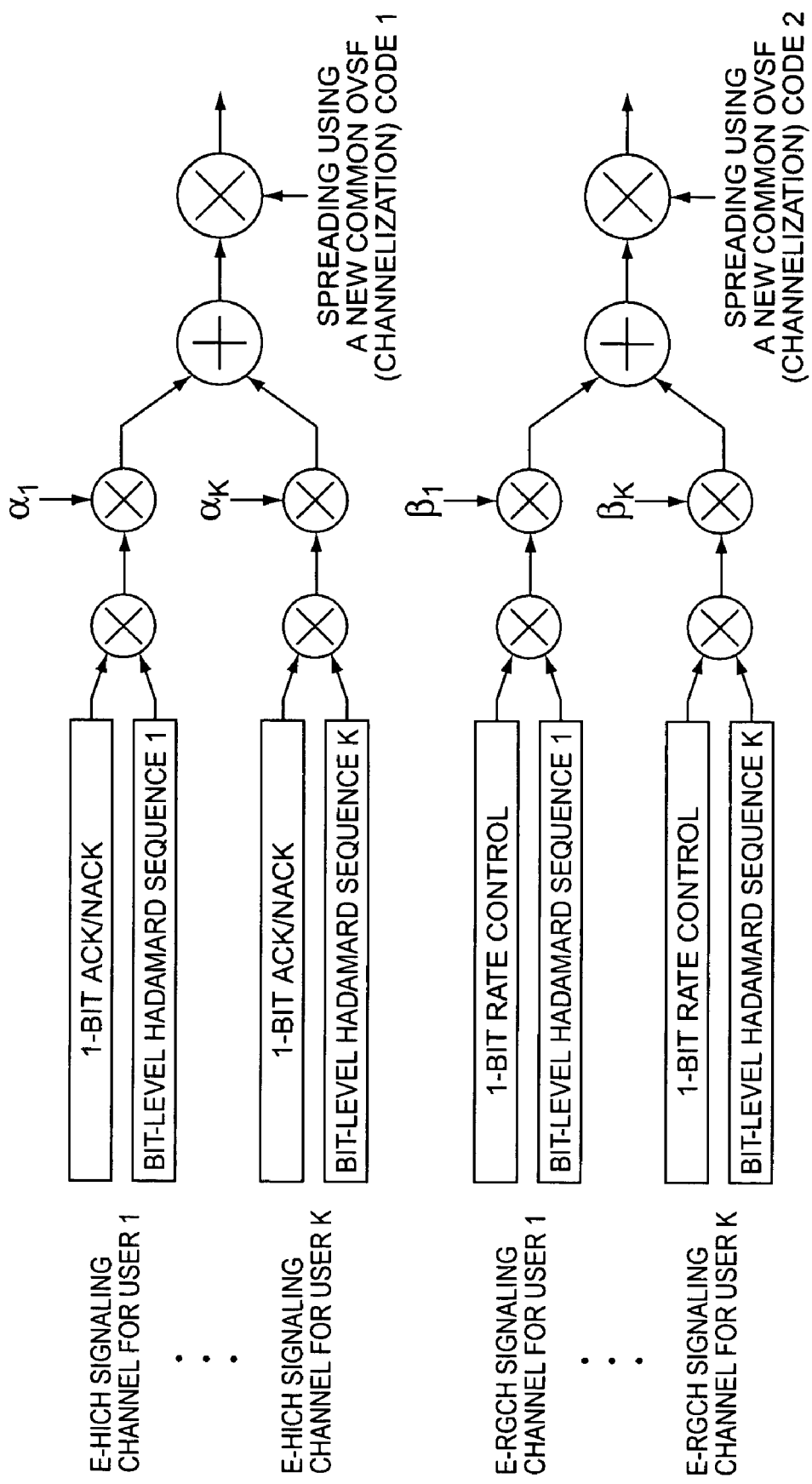
FIG. 3 illustrates a block diagram of a code-division multiplexer that code-division multiplexes E-HICH and E-RGCH control signals on separate OVSF channelization codes.

The aforementioned approach for a CDM architecture may in principle be applied to any low-rate (e.g. 1 or more bits per TTI) downlink control signalling. For instance, the same OVSF channelization code may code division multiplex both the E-HICH and the E-RGCH, as shown in the exemplary CDM system of FIG. 2. Alternatively, separate OVSF channelization codes may code-division multiplex the E-HICH and the E-RGCH. For example, one OVSF channelization code spreads the E-HICH and one OVSF-code spreads the E-RGCH, as shown in the exemplary CDM system of FIG. 3. In either case, the spread ACK/NACK and rate control signals for the E-HICH and E-RGCH are scaled by $\alpha$ and $\beta$, respectively, before being combined as shown in FIGS. 2 and 3. This amplitude scaling is used to guarantee sufficient performance for each signalling channel.

Figure 4:
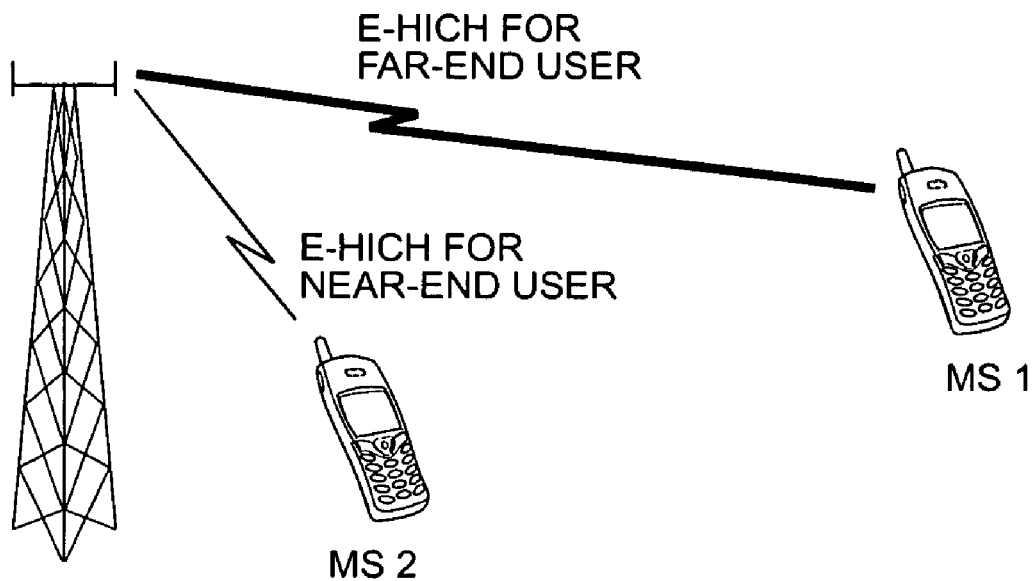
FIG. 4 illustrates a near-far scenario.

As well understood, the aforementioned concept for Enhanced Uplink implies that the orthogonality of the spread signals holds at the receiver if the fading channel is non-dispersive and constant within a slot. With multi-path propagation, the orthogonality is very much intact as long as the channel is constant within a slot due to the large processing gain against the inter-chip interference. However, high Doppler channels, in which multi-path fading varies noticeably during a slot interval, may severely compromise the orthogonality. In some situations, loss of orthogonality may result in severe performance penalty. Further, additional factors associated with the wireless transmissions may aggravate the performance penalty problem. The near-far problem, illustrated in FIG. 4, represents one aggravating factor. The term "near-far problem" refers to situations when signals of high transmission power are code-division multiplexed (CDM) on an OVSF-channelization code also used to spread signals of small transmission power. This situation arises, for example, when the base station simultaneously transmits to a far mobile station located near the cell boundary and to a near mobile station located near the center of a cell. The situation may also arise when the base station simultaneously transmits signals to mobile stations having widely different error requirements.

The near-far problem in combination with the loss of orthogonality causes an increase in co-channel interference at the near mobile station (mobile station 2). The amount of interference due to loss of orthogonality depends on the cross-correlation between the pair of bit-level spreading sequences assigned to the near and far mobile stations. Some pairs of sequences exhibit relatively weak cross-correlation, and are therefore more resistant to the near-far problems than other pairs of sequences. Other sequence pairs exhibit relatively strong cross-correlation, and are therefore less resistant to the near-far problem. Sequence pairs having a strong cross-correlation amplify the near-far problem. Further, if two near mobile stations are assigned sequence pairs having strong cross-correlations, the performance at the near mobile stations will be bad all the time. Because this results in a consistently bad performance, this situation is undesirable.

Figure 5:
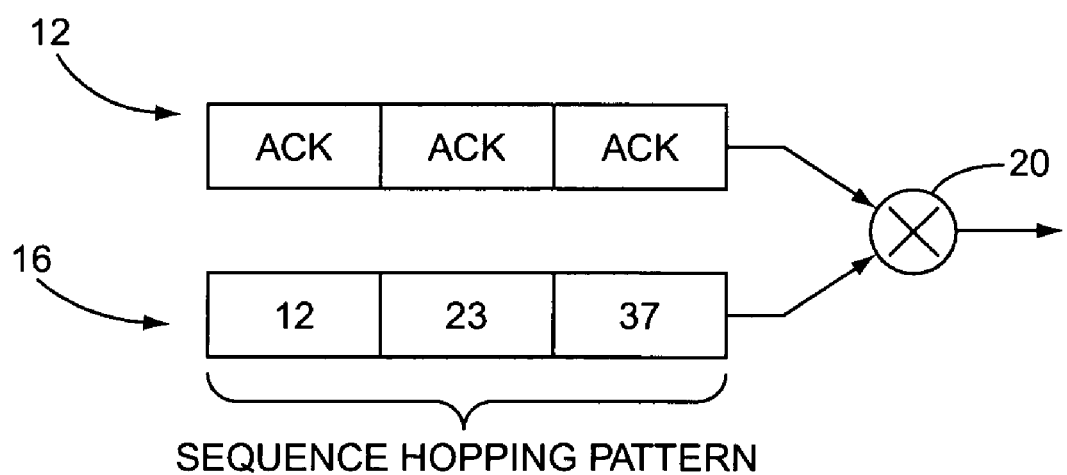
FIG. 5 illustrates a portion of an exemplary block diagram of a CDM system using a sequence-hopping pattern of the present invention.

The present invention addresses the near-far problem by using a different bit-level spreading sequence for each slot of a TTI to initially spread the control signal. Generally, the present invention changes the bit-level spreading sequence assignments of a control sub-channel from slot to slot in a system that allows a number of control sub-channels to share a common control channel/OVSF channelization code. A sequence-hopping pattern assigned to each sub-channel indexes a different bit-level spreading sequence for each slot of a pre-determined time interval. For example, FIG. 5 shows a 3-slot TTI 12 having a 1-bit ACK signal in each slot and a 3-slot sequence-hopping pattern 14. Sequence-hopping pattern 14 references sequence 12 for slot 1, sequence 5 for slot 2, and sequence 17 for slot 3. Therefore, multiplier 20 may spread the 1-bit ACK signal in slots 1, 2, and 3 using bit-level spreading sequences $c_{12}$, $c_5$, and $c_{17}$, respectively (see FIG. 1).

The following describes several exemplary embodiments for generating and/or assigning such a sequence-hopping pattern. The sequence-hopping patterns described below include cyclic sequence-hopping patterns, pseudo-random sequence-hopping patterns, and intelligent sequence-hopping patterns. In all three types, the sequence-hopping pattern comprises a pattern of sequence indices, wherein each element represents an index that identifies a particular Hadamard sequence for bit-level spreading.

FIG. 6 illustrates an exemplary set of cyclic sequence-hopping patterns. This exemplary set comprises forty sequence-hopping patterns, with each sequence-hopping pattern comprising fifteen sequence indices. A total of forty sequence indices are available for any given sequence-hopping pattern. These sequence indices may reference any known bit-level spreading sequences. For example, indices 0 through 19 may reference the bit-level spreading sequences 0 through 19 shown in FIG. 1. The remaining bit-level spreading sequences (20 through 39) may, for example, be generated by multiplying each of the 0 through 19 sequences by j, where j is the square root of −1. In other words, sequence k+20 may be obtained by multiplying j time sequence k. Each sequence-hopping pattern corresponds to one sub-channel, and therefore, corresponds to one mobile station or one control sub-channel. As shown in FIG. 6, each successive sequence-hopping pattern of the set of sequence-hopping patterns comprises a cyclic shift of a base sequence-hopping pattern. In general, if a spreading sequence k bit-level spreads a control signal in a time slot i, the spreading sequence (k+1)%40 will be used to bit-level spread the same control signal in the subsequent time slot (i+1). The expression n%m stands for n modulo m whereby m=40 has been selected in view of the example presented in FIG. 6. For example, assume that the first row of the set of sequence-hopping patterns in FIG. 6 corresponds to the base sequence-hopping pattern. As shown in FIG. 6, cyclic shifts of the base sequence-hopping pattern of the first row generate subsequent sequence-hopping patterns.

While FIG. 6 shows a base sequence-hopping pattern that comprises sequential sequence indices (e.g., 1, 2, 3, 4, . . . ), the cyclic process of the present invention is not so limited. For example, the cyclic process also applies to a pseudo-random base sequence-hopping pattern, where cyclic shifts of the base pseudo-random sequence-hopping pattern generate successive rows of the set of sequence hopping patterns.

In a second embodiment, a pseudo-random process that satisfies the following properties generates the set of sequence-hopping patterns.

The sequence assignment changes from slot to slot.

No sequence bit-level spreads more than one control signal in any slot.

The sequence-hopping pattern repeats after a predetermined number of slots.

No one mobile station uses the same hopping sequence more than once in a TTI.

Figure 7:
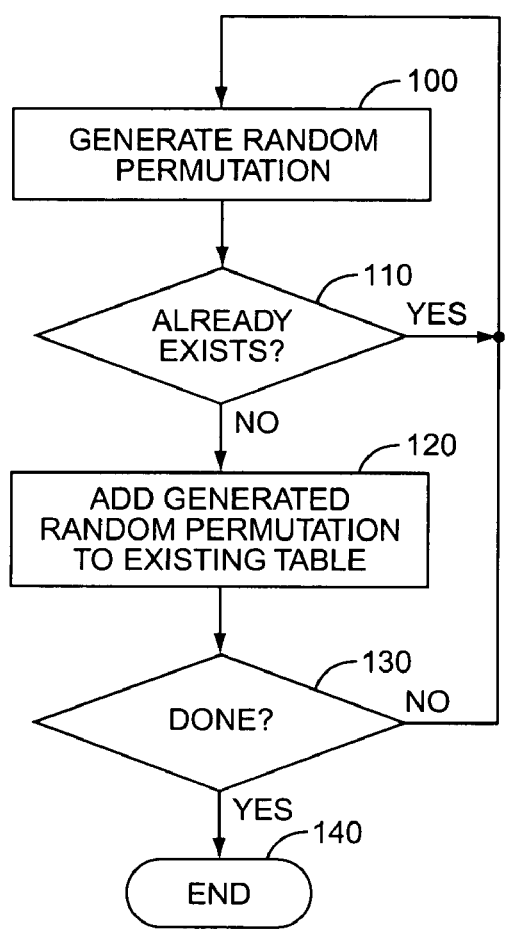
FIG. 7 illustrates one exemplary pseudo-random process for generating a set of sequence hopping patterns.

FIG. 7 illustrates one exemplary procedure for generating a sequence-hopping pattern satisfying these four properties. After generating a random permutation between a number 0 and (K−1) (block 100), the generated random permutation is added to the set of existing permutation patterns (block 120) unless the obtained permutation is identical to any already existing permutation pattern in the table (block 110). These steps repeat until the set of sequence hopping patterns includes a sufficient number of permutation patterns (block 130). Each mobile station or one control sub-channel uses one of the permutation patterns from the set of patterns. An exemplary pseudo-random hopping pattern may be obtained by Galois field operation using a primitive element.

FIG. 8 illustrates a pseudo-random sequence-hopping pattern satisfying all the aforementioned properties. The illustrated set of sequence-hopping patterns supports forty control sub-channels each having a fifteen slot TTI. Each control sub-channel corresponds to a different mobile station and may provide control signals to the corresponding mobile station. According to this set of sequence-hopping patterns, sub-channel 1 uses bit-level Hadamard sequence 12 in slot 1, sequence 23 in slot 2, sequence 37 in slot 3, etc. The hopping pattern repeats itself after 15 slots.

As shown in FIG. 8, the above-described pseudo-random process generates a set of sequence-hopping patterns where a particular index only appears once in a given sequence-hopping pattern. Further, a particular index only appears once in a given column of the set of sequence-hopping patterns. In other words, a particular index is unique for a given sequence-hopping pattern and for corresponding slots of the set of sequence-hopping patterns. As a result, the generated set of sequence-hopping patterns prevents a mobile station from using a bad sequence more than once.

In another embodiment, an intelligent sequence assignment process generates the sequence-hopping pattern. According to the present invention, the intelligent process exploits the fact that different pairs of bit-level Hadamard sequences exhibit different performance parameters, i.e., mutual near-far resistant ratios. To illustrate this point, FIG. 9 lists the mutual near-far resistant ratios between pairs of length-20 Hadamard sequences of FIG. 6 in a flat fading channel with 200 Hz Doppler spread. As shown in FIG. 9, sequences $c_0$ and $c_2$ have a mutual near-far resistant ratio of 25 dB, while sequences $c_4$ and $c_6$ only have an 8 dB mutual near-far resistant ratio.

Figure 10:
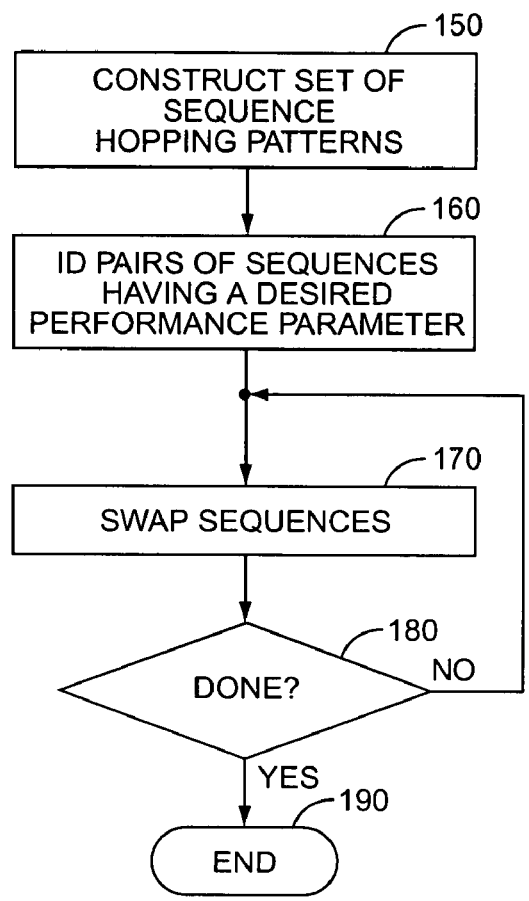
FIG. 10 illustrates one exemplary intelligent process for generating a set of sequence hopping patterns.

In one exemplary embodiment illustrated in FIG. 10, the following steps may construct an intelligent sequence-hopping pattern matrix:

Construct a set of sequence-hopping patterns (block 150) using, for example, the cyclic or pseudo-random process as described above.

Identify pairs of Hadamard sequences having the desired performance parameter (block 160), i.e., no remaining sequence has poor mutual near-far resistant ratios simultaneously to these sequences.

Modify the set of sequence-hopping patterns obtained from the first step through sequence swapping (block 170) so that after the swapping procedure, each sequence referenced by sub-channels 1 and 2 have an acceptable mutual near-far resistant ratio relative to the remaining sub-channel sequence-hopping patterns.

A predetermined threshold may be used to identify sequences that have an acceptable mutual near-far resistant ratio. To that end, the table of mutual near-far resistant ratios depicted in FIG. 9 may help identify acceptable pairs of sequences having a sufficiently large mutual near-far resistant ratio between two pairs of sequences in a given slot. Acceptable pairs ($c_n$; $c_m$) of sequences correspond to pairs having a mutual near-far resistant ratio above a certain threshold value, and for which any other sequence pair, i.e. ($c_n$;$c_i$) or ($c_i$;$c_m$) with i≠n and i≠m, has at least a mutual near-far resistant ratio exceeding a threshold value, e.g., −11.5 dB.

To illustrate the intelligent process, FIG. 11 illustrates an exemplary sequence-hopping pattern generated using the above-described cyclic pseudo-random and intelligent processes for an E-HICH. The table presented in FIG. 9 reveals that the following pairs of sequences satisfy the above-described threshold requirements: $(c_0;c_5)$, $(c_1;c_{16})$, $(c_2;c_{10})$, $(c_3;c_{11})$, $(c_4;c_{14})$, $(c_5;c_7)$, $(c_6;c_5)$, $(c_7;c_{16})$, $(c_8;c_{12})$, $(c_9;c_4)$, $(c_{10};c_{18})$, $(c_{11};c_{19})$, $(c_{12};c_8)$, $(c_{18};c_{11})$, and $(c_{19};c_{15})$. From these pairs of sequences, the intelligent process modifies the sequence-hopping pattern of sub-channels 1 and 2 as shown in FIG. 6 as follows: For slot number 1, $(c_0;c_5)$ represent the desired pair of sequences for sub-channels 1 and 2. This is achieved by swapping the sequence assignment reference number in slot 1 of sub-channel 6 with the sequence reference number in slot 1 of sub-channel 2. A repetition of this procedure for the remaining slots (2 to 15) results in the intelligent sequence-hopping patterns shown in FIG. 11.

The resulting table comprises a set of sequence-hopping patterns, where the sequence-hopping patterns for sub-channels 1 and 2 are assigned to signals with high transmit power. As a result, this intelligent process provides two or more sequence-hopping patterns for multiple sub-channels that do not all result in a bad near-far resistant ration with the sequence-hopping patterns in the remaining sub-channels.

After generating the set of sequence-hopping patterns using the intelligent process, the base station assigns selected sequence-hopping patterns based on transmit power. For example, the base station may assign a pair of sequence-hopping patterns with weak correlation, and thus strong near-far resistant characteristics, to mobile stations with relatively large transmit power.

In addition to the above-described processes for generating the sequence-hopping patterns, the present invention may also apply an intelligent sequence-hopping pattern assignment process. According to this embodiment of the invention, the base station evaluates pairs of adjacent or non-adjacent sequence-hopping patterns to determine an overall performance parameter, i.e., an overall near-far resistant ratio, of the sequences associated with the pair(s) of sequence-hopping patterns. Based on the overall performance parameters, pairs of sequence-hopping patterns having a sufficiently acceptable overall performance parameter are reserved for transmitting high power control signals. In other words, it is advantageous to assign sequence-hopping patterns in such a way that no sequence-hopping pattern has a poor overall near-far resistant ratio relative to the sequence-hopping pattern(s) assigned to higher power control signals.

It will be appreciated that a set of sequence-hopping patterns may be generated according to the intelligent process using performance parameters different from the mutual near-far resistant ratio discussed above. Further, it will also be appreciated that the intelligent pseudo-random process may use multiple performance parameters to determine how best to pair sequences in adjacent channels.

Figure 12:
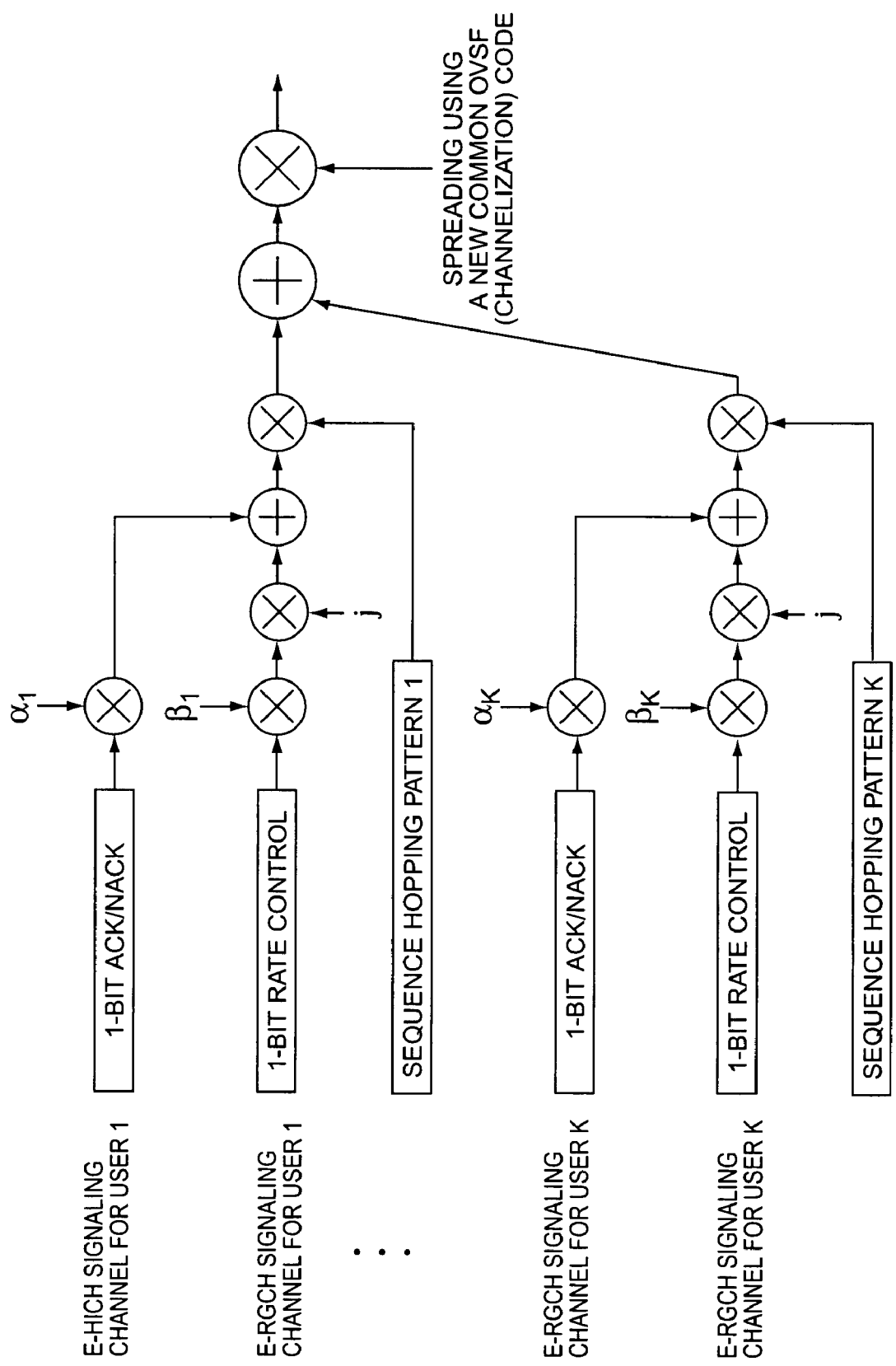
FIG. 12 illustrates a block diagram of one exemplary CDM system that IQ-multiplexes the E-HICH and E-RGCH control signals onto the same bit-level Hadamard sequence.

It will also be appreciated that the sequence-hopping patterns generated according to any of the above-described processes may be used to IQ-multiplex control signals in the E-HICH and the E-RGCH. For example, if sequence k spreads the control signal in the E-HICH for a given user in a particular slot, the E-RGCH addressed to the same user uses the sequence (k+20) in the same slot for the E-RGCH control signal. In this way, the bit-level Hadamard sequences for E-HICH and E-RGCH assigned to the same user simply differ by the complex multipliers. FIG. 12 illustrates an exemplary block diagram for implementing this I/Q multiplexing. As shown in FIG. 12, this I/Q multiplexing technique may simplify the implementation of the receiver.

The processes described herein may be used to obtain sequence-hopping patterns suitable for one hop per TTI. However, the present invention is not so limited. It will be appreciated by those skilled in the art that the processes described herein also apply to systems that use a sequence-hopping pattern suitable for one hop per any desired time interval. In any event, according to the present invention, a different bit-level Hadamard sequence referenced by the corresponding sequence-hopping pattern spreads each control signal in each slot of a TTI or predetermined time interval.

Figure 13:
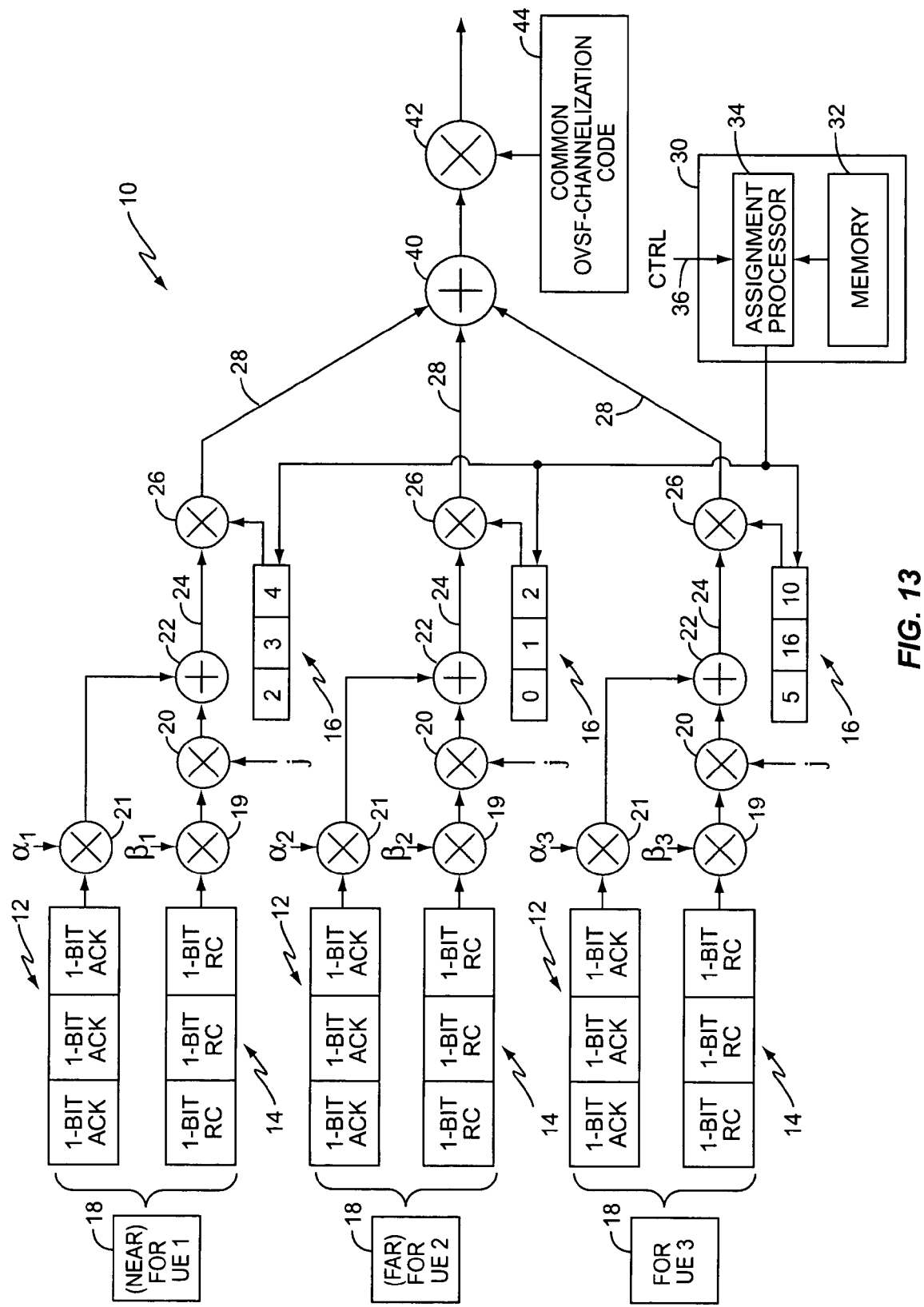
FIG. 13 illustrates a block diagram of an exemplary CDM system that IQ multiplexes E-HICH and E-RGCH control signals with bit-level spreading sequences referenced by selected sequence-hopping patterns according to the present invention.

Any known code-multiplexer may use the above-described sets of sequence-hopping patterns. FIG. 13 illustrates one exemplary code-multiplexer for implementing any or all of the above-described CDM processes. For purposes of illustration, FIG. 13 only illustrates 3 sub-channels each having a TTI of 3 slots. However, those skilled in the art will appreciate that the present invention is not limited to the illustrated implementation.

As shown in FIG. 13, the CDM system 10 comprises a control processor 30, an ACK/NACK control signal 12, a rate control signal 14, and a sequence-hopping pattern 16 for each mobile station 18. Multipliers 19 and 21 scale the control signals 12, 14, while multiplier 20 and summer 22 I/Q multiplex the scaled ACK/NACK control signal 12 with the corresponding scaled rate control signal 14 to generate a combined I/Q control signal 24.

Control processor 30 comprises a memory 32 and an assignment processor 34. Memory 32 stores a set of sequence-hopping patterns generated according to any of the above-described methods. Based on the generated set of sequence-hopping patterns, assignment processor 34 selects and assigns a sequence-hopping pattern to each mobile station 18. In one embodiment, assignment processor 34 may select and assign the sequence-hopping pattern 16 sequentially, i.e., sequence-hopping pattern 1 to mobile station 1, sequence-hopping pattern 2 to mobile station 2, sequence-hopping pattern 3 to mobile station 3, etc. Alternatively, in another embodiment, assignment processor 34 may select and assign the sequence-hopping patterns 16 based on one or more variables provided by control signal 36. For example, control signal 36 may indicate to assignment processor 34 which mobile stations 18 are associated with high transmission powers (far mobile stations) and which mobile stations 18 are associated with low transmission powers (near mobile stations). Based on this, assignment processor 34 may assign sequence-hopping patterns 16 having an acceptable mutual near-far resistant ratio (as discussed above) to the mobile stations 18 associated with high transmission powers.

In any event, multiplier 26 multiplexes each assigned sequence-hopping pattern 16 with combined I/Q control signal 24. As described above, the sequence indexed by slot 1 of sequence-hopping pattern 16 spreads the control signal in slot 1. For example, for mobile station 1, sequence 2 spreads the combined I/Q control signal 24 in slot 1. Similarly, sequence 3 spreads the combined I/Q control signal 24 in slot 2 and sequence 4 spreads the combined I/Q control signal 24 in slot 3. This occurs for each mobile station 18. Combiner 40 then combines the spread control signals 28. Multiplier 42 spreads the output of combiner 40 using a common OVSF channelization code 44 to generate the output control signal to be transmitted to each mobile station 18.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of code-multiplexing a control signal onto a shared control channel comprising:
   repeating a control bit for a mobile station associated with said shared control channel in each slot of a predetermined time interval;
   generating a set of sequence hopping patterns;
   assigning the mobile station to a sequence hopping pattern selected from said set of sequence hopping patterns;
   spreading the control bit in each slot of the predetermined time interval at bit rate using a different bit-level spreading sequence of the selected sequence hopping pattern for each slot to generate a different bit sequence for the mobile station in each slot;
   assigning a common channelization code to the shared control channel; and
   spreading the bit sequences generated for the predetermined time interval for a plurality of mobile stations using the assigned common channelization code.

2. The method of claim 1 wherein each sequence-hopping pattern in said set of sequence-hopping patterns comprises a cyclic shift of a common sequence-hopping pattern.

3. The method of claim 1 wherein each sequence-hopping pattern in said set of sequence-hopping patterns comprises a pseudo-random sequence.

4. The method of claim 3 wherein all elements of a particular sequence-hopping pattern are unique.

5. The method of claim 3 wherein corresponding elements in the set of sequence-hopping patterns are unique.

6. The method of claim 1 wherein at least one pair of sequence-hopping patterns is generated such that corresponding elements of the generated pair have a performance parameter that meets or exceeds a predetermined threshold.

7. The method of claim 6 further comprising assigning the sequence-hopping patterns of the generated pair(s) of sequence-hopping patterns to the mobile station(s) associated with high power control signals.

8. The method of claim 6 wherein the performance parameter comprises a mutual near-far resistant ratio.

9. The method of claim 1 further comprising identifying one or more pairs of adjacent sequence-hopping patterns having an overall performance parameter that meets or exceeds a predetermined threshold.

10. The method of claim 9 wherein assigning each mobile station to a selected sequence-hopping pattern comprises assigning a mobile station requiring the highest transmit power to one of the sequence-hopping patterns in the identified pair(s) of sequence-hopping patterns.

11. The method of claim 1 further comprising subdividing the control channel into a plurality of sub-channels, where each sub-channel is associated with one of the sequence-hopping patterns in the set of sequence-hopping patterns.

12. The method of claim 1 wherein the common channelization code comprises an orthogonal variable spreading factor channelization code.

13. The method of claim 1 wherein said bit-level spreading sequence comprises a Hadamard spreading sequence.

14. The method of claim 1 wherein the predetermined time interval comprises one of 3 slots and 15 slots.

15. A method of code-multiplexing a control message onto a shared control channel associated with a plurality of mobile stations comprising:
   generating a set of sequence-hopping patterns;
   assigning a mobile station associated with the shared control channel to a selected sequence-hopping pattern;
   assigning a unique bit-level spreading sequence to each slot of a predetermined time interval according to the sequence-hopping pattern selected for the mobile station;
   assigning a common channelization code to the shared control channel;
   spreading a control bit repeated in each slot of the predetermined time interval at bit rate with the unique spreading code assigned to each slot to generate a different bit sequence in each slot of the predetermined time interval for the mobile station; and
   spreading the bit sequences generated for the predetermined time interval for a plurality of mobile stations using the assigned common channelization code.

16. The method of claim 15 wherein each sequence-hopping pattern of said set of sequence-hopping patterns comprises a cyclic shift of a common sequence-hopping pattern.

17. The method of claim 15 wherein each sequence-hopping pattern of said set of sequence-hopping patterns comprises a pseudo-random sequence.

18. The method of claim 15 wherein two adjacent sequence-hopping patterns comprise a pair of sequence-hopping patterns, and wherein at least one pair of sequence-hopping patterns are generated such that corresponding elements of the generated pair have a mutual near-far resistant ratio that meets or exceeds a predetermined threshold.

19. A code multiplexer for multiplexing a control signal onto a shared control channel associated with a plurality of mobile stations comprising:
   a memory configured to store a set of sequence-hopping patterns, wherein each element of each sequence-hopping pattern references a unique bit-level spreading sequence;
   an assignment processor configured to assign the control signal for one of the mobile stations to a selected sequence-hopping pattern, and to assign a common channelization code to the shared control channel;
   a first multiplexer to spread the control signal repeated in each slot of a predetermined time interval at bit rate using the unique bit-level spreading sequence referenced by the selected sequence-hopping pattern to generate a different bit sequence in each slot of the predetermined time interval; and
   a second multiplexer to spread the bit sequences generated for the predetermined time interval for a plurality of mobile stations using the assigned common channelization code.

20. The code multiplexer of claim 19 wherein said memory is configured to store said set of sequence-hopping patterns based on a cyclical shift of a common sequence-hopping pattern.

21. The code multiplexer of claim 19 wherein said memory is configured to store said set of sequence-hopping patterns based on a pseudo-random sequence generation process.

22. The code multiplexer of claim 19 wherein two adjacent sequence-hopping patterns comprise a pair of sequence-hopping patterns, and wherein said memory is configured to store at least one pair of sequence-hopping patterns having a mutual near-far resistant ratio that meets or exceeds a predetermined threshold.

* * * * *